United States Patent
Jun et al.

(10) Patent No.: US 7,492,782 B2
(45) Date of Patent: Feb. 17, 2009

(54) SCALABLE CROSSBAR MATRIX SWITCHING APPARATUS AND DISTRIBUTED SCHEDULING METHOD THEREOF

(75) Inventors: Jong-Arm Jun, Daejon (KR);
Sung-Hyuk Byun, Daejon (KR);
Byungjun Ahn, Daejon (KR);
Young-Sun Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 737 days.

(21) Appl. No.: 10/990,250

(22) Filed: Nov. 15, 2004

(65) Prior Publication Data

US 2005/0152352 A1    Jul. 14, 2005

(30) Foreign Application Priority Data

Dec. 27, 2003  (KR)  .................. 10-2003-0098348
Jul. 6, 2004    (KR)  .................. 10-2004-0052278

(51) Int. Cl.
*H04L 12/56* (2006.01)
(52) U.S. Cl. .................................................. 370/415
(58) Field of Classification Search ............. 370/447, 370/461, 462, 412, 415
See application file for complete search history.

(56) References Cited

U.S. PATENT DOCUMENTS

| | | | |
|---|---|---|---|
| 5,299,190 A | 3/1994 | LaMaire et al. | |
| 5,500,858 A | 3/1996 | McKeown | |
| 6,205,150 B1 * | 3/2001 | Ruszczyk | 370/412 |
| 6,351,466 B1 | 2/2002 | Prabhakar et al. | |
| 6,549,532 B1 * | 4/2003 | Dieudonne | 370/415 |
| 6,570,873 B1 * | 5/2003 | Isoyama et al. | 370/415 |
| 6,661,788 B2 * | 12/2003 | Angle et al. | 370/390 |
| 6,771,642 B1 * | 8/2004 | Seaver et al. | 370/415 |
| 2002/0039364 A1 * | 4/2002 | Kamiya et al. | 370/415 |
| 2003/0123468 A1 * | 7/2003 | Nong | 370/412 |
| 2003/0227932 A1 * | 12/2003 | Meempat et al. | 370/415 |
| 2004/0085979 A1 * | 5/2004 | Lee et al. | 370/412 |
| 2005/0157713 A1 * | 7/2005 | Klausmeier et al. | 370/388 |
| 2006/0165070 A1 * | 7/2006 | Hall et al. | 370/369 |

OTHER PUBLICATIONS

Ghahramani, "Fundamentals of Probability", 2000, Prentice-Hall, Second Edition, p. 369.*

* cited by examiner

*Primary Examiner*—Hassan Kizou
*Assistant Examiner*—Joshua Smith
(74) *Attorney, Agent, or Firm*—Blakely, Sokoloff, Taylor & Zafman

(57) ABSTRACT

A high speed and high capacity switching apparatus is disclosed. The apparatus includes: N input ports each of which for outputting maximum l cells in a time slot, wherein each of the N input ports includes N virtual output queues (VOQs) which are grouped in l virtual output queues group with n VOQs; N×N switch fabric having $l^2$ crossbar switch units for scheduling cells inputted from N input ports based on a first arbitration function based on a round-robin, wherein l VOQ groups are connected to l XSUs; and N output ports connected to l XSUs for selecting one cell from l XSUs in a cell time slot by scheduling cells by a second arbitration function based on a backlog weighed round-robin, which operates independently of the first arbitration function, and transferring the selected cell to its output link.

16 Claims, 13 Drawing Sheets

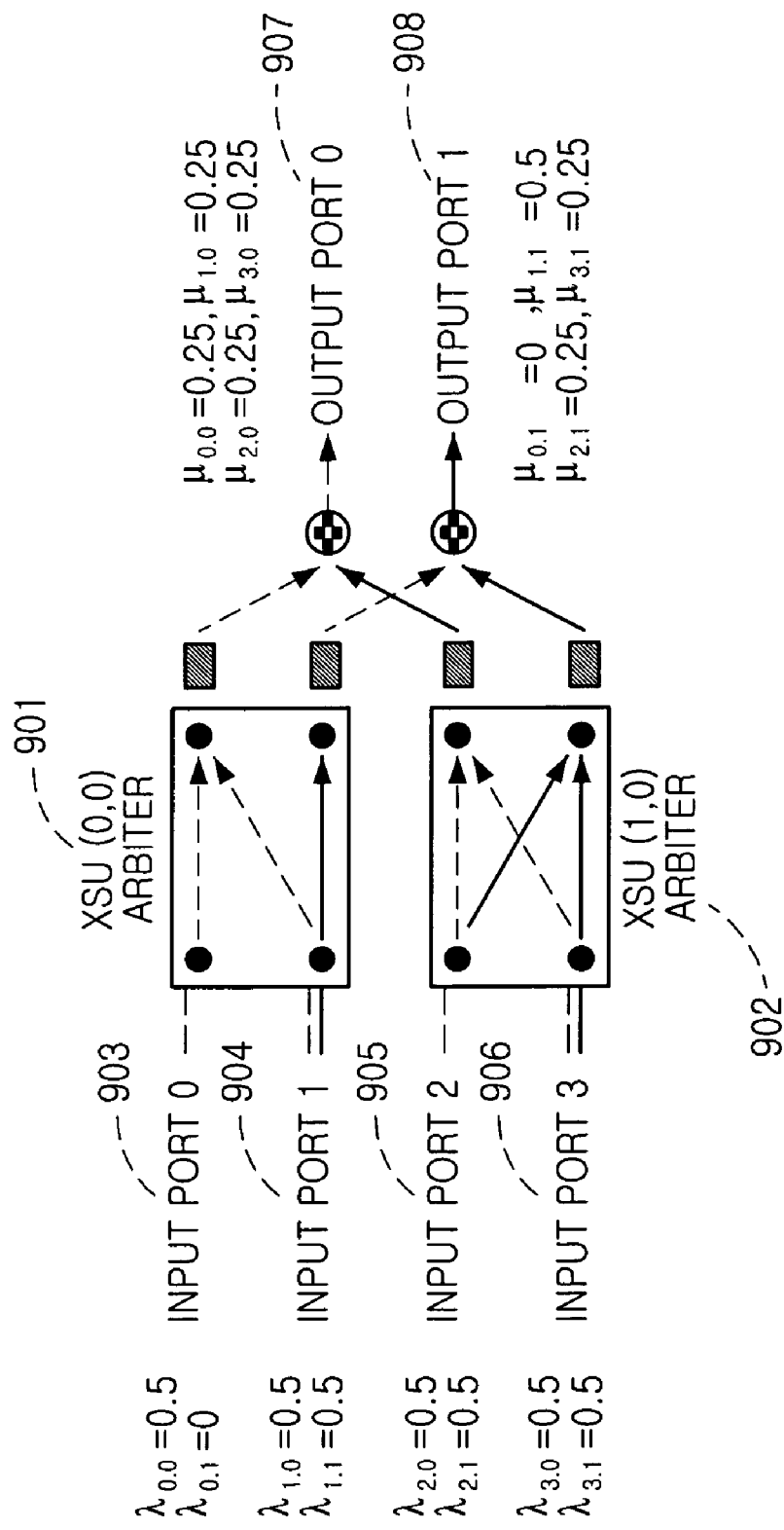

$W_j = \{0,2,3,4,5,6,7\}$

A cell from input 1
is enqueued

1st State : SDB is empty $W_j = \{0,5,6,7\}$

A cell from input 1 is dequeued and
A cell from input 4 is enqueued

2st State : SDB is non -empty $W_j = \{0,1,2,3,4,5,6,7\}$ $g_j = 5$      $r_j = 4$ A cell from input 4 is
not dequeued 3rd State : SDB is non -empty

SCALABLE CROSSBAR MATRIX SWITCHING APPARATUS AND DISTRIBUTED SCHEDULING METHOD THEREOF

FIELD OF THE INVENTION

The present invention relates to a scalable crossbar matrix switching apparatus for a high speed mess capacity switching and a distributed scheduling method thereof; and, more particularly, to a scalable crossbar matrix switching apparatus and a distributed scheduling method thereof for transferring a cell from an input port to an output port in a N×N switch having interconnected $l^2$ number of n×n crossbar switch units, wherein the n is N's divisor and l=N/n.

DESCRIPTION OF RELATED ARTS

In a case of a N×N output-queued switch, a switch fabric and a memory must be operated in N times faster than the operation speed of an input line rate because N cells must transfer to a predetermined output port in one time slot.

The output-queued switch has superior characteristic in a 100% throughput and a quality of service (QoS). However, the above mentioned speed-up limitation is the main reason that the output-queued switch is not used as a high speed switch.

In other hands, an input-queued switch is used as the high speed switch because the switch fabric and the memory are operated in same speed of the input line rate.

Normally, the input-queued switch has a virtual output queue (VOQ) type of an input port for solving a head-of-line locking problem and a switch fabric having a crossbar which is a non blocking high speed switch fabric.

Recently, there are various arbitration methods introduced for providing 100% throughput for solving a contention problem between an input port and an output port in the input-queued switch. For example, a rapid one-to-one match method is introduced in U.S. Pat. No. 5,267,235, issued to Thacker et al., entitled "Method and apparatus for resource arbitration", and a method of scheduling requests from $N^2$ input queues to N outputs is also introduced in U.S. Pat. No. 5,299,190, issued LaMaire et al., entitled "2-Dimensional Round Robin Matching (2DRR)". Furthermore, a high-bandwidth input-queued switch (iSLIP) is introduced in U.S. Pat. No. 5,500,858, issued to Nicholas W. McKeown, et al., entitled "Method and apparatus for scheduling cells in an input-queued switch" and a method for dual round robin matching is proposed in an article by H. J. Chao and J-S Park, entitled "Centralized Contention Resolution Schemes for a Large-Capacity Optical ATM switch", *Proc. IEEE ATM workshop'97*, Fairfax, Va., pp. 10-11, May 1998.

The above mentioned arbitration methods provide 100% throughput but there are an arbitration time limitation corresponding to the number of the input ports. Therefore, the input-queued switch is not suitable as a high speed high capacity switch.

For example, in a case of "iSLIP", which is the most popular switch among the above mentioned proposals, the iSLIP is used as a switch has less than 32 ports. Theoretically, there are at least 512×512 crossbar switch fabrics required for a Tera bit speed switch having 2.5 Gbps port speed. It is very hard to implement the Tera bit speed switch by using a single crossbar switch fabric and a conventional arbitration method.

Therefore, a scalable switch structure has been introduced for overcoming the above mentioned problem of conventional switch such as a channel group switching method based on a distribution network disclosed at U.S. Pat. No. 5,724,351, issued to Chao et al., entitled "Scaleable multicast ATM switch" and a crossbar switch structure of a cols network type introduced by F. M. Chiussi, J. G. Kneuer, and V. P. Kumar, entitled "Low-cost Scalable switching solutions for broadband Networking: the Atlanta architecture and chipset", *IEEE Commun. Mag.*, pp. 4453, December 1997.

In a case of the channel group switching method, there is an advantage of constructing a high capacity switch by using a less capacity group switch elements. However, a design of the distribution network becomes very complex because of the huge number of input ports.

Furthermore, in a case of the crossbar switch structure of the cols network type, it requires a complex scheduling method for distributing traffic loads to a plurality of paths between input ports and output ports since there are a plurality of paths exist between the output ports and the input ports. Also, if the number of high speed input/output ports is increased, there must be high speed crossbar switch elements are required. It becomes another difficulty to construct the high speed high capacity switch.

SUMMARY OF THE INVENTION

It is, therefore, an object of the present invention to provide a scalable crossbar matrix switching apparatus having a single path existed between an input port and an output port and a scalable structure for high capacity switch.

It is another object to the present invention to provide a distributed arbitration method used in a scalable crossbar matrix switching apparatus for a high capacity switch.

In accordance with an aspect of the present invention, there is provided a high capacity switching apparatus, including: N input ports each of which for outputting maximum l cells in a time slot, wherein each of the N input ports includes N virtual output queues(VOQs) which are grouped in l virtual output queues group with n VOQs; N×N switch fabric having $l^2$ crossbar switch units (XSUs) for scheduling cells inputted from N input ports based on a first arbitration function based on a round-robin, wherein l VOQ groups are connected to l XSUs; and N output ports each of which connected to l XSUs for selecting one cell from l XSUs in a cell time slot by scheduling cells by the second arbitration function based on a backlog weighed round-robin, which operates independently of the first arbitration function, and transferring the selected cell to its output link.

In accordance with another aspect of the present invention, there is provided a distributed scheduling method used in a high capacity switching apparatus including a scalable switch structure N input ports, wherein each of the N input ports includes N virtual output queues (VOQs) which are grouped in l virtual output queues group with n VOQs, wherein the N, l and n is a natural number, N×N switch fabric having $l^2$ crossbar switch units, wherein l VOQ groups are connected to l XSUs; and N output ports connected to l XSUs, the distributed scheduling method including two steps of: a) at an XSU arbiter of each XSU, scheduling cells of VOQs inputted from the N input ports by using the first arbitration based on a round-robin when each of the N input ports could output maximum l cells; and b) at an output port arbiter of each output port, selecting and outputting maximum one cell by the second arbitration based on a backlog weighed round-robin which operates independently of the first arbitration.

BRIEF DESCRIPTION OF THE DRAWINGS

The above and other objects and features of the present invention will become better understood with regard to the following description of the preferred embodiments given in conjunction with the accompanying drawings, in which:

FIG. 6 is a diagram illustrating the grant arbiter 410 in accordance with a preferred embodiment of the present invention;

FIG. 9 shows XSU arbiters perform the second stage arbitration when an input traffic is non-uniform;

DETAILED DESCRIPTION OF THE INVENTION

Hereinafter, a scalable crossbar matrix switching apparatus and a distributed scheduling method thereof in accordance with a preferred embodiment of the present invention will be described in more detail with reference to the accompanying drawings.

Figure 1:
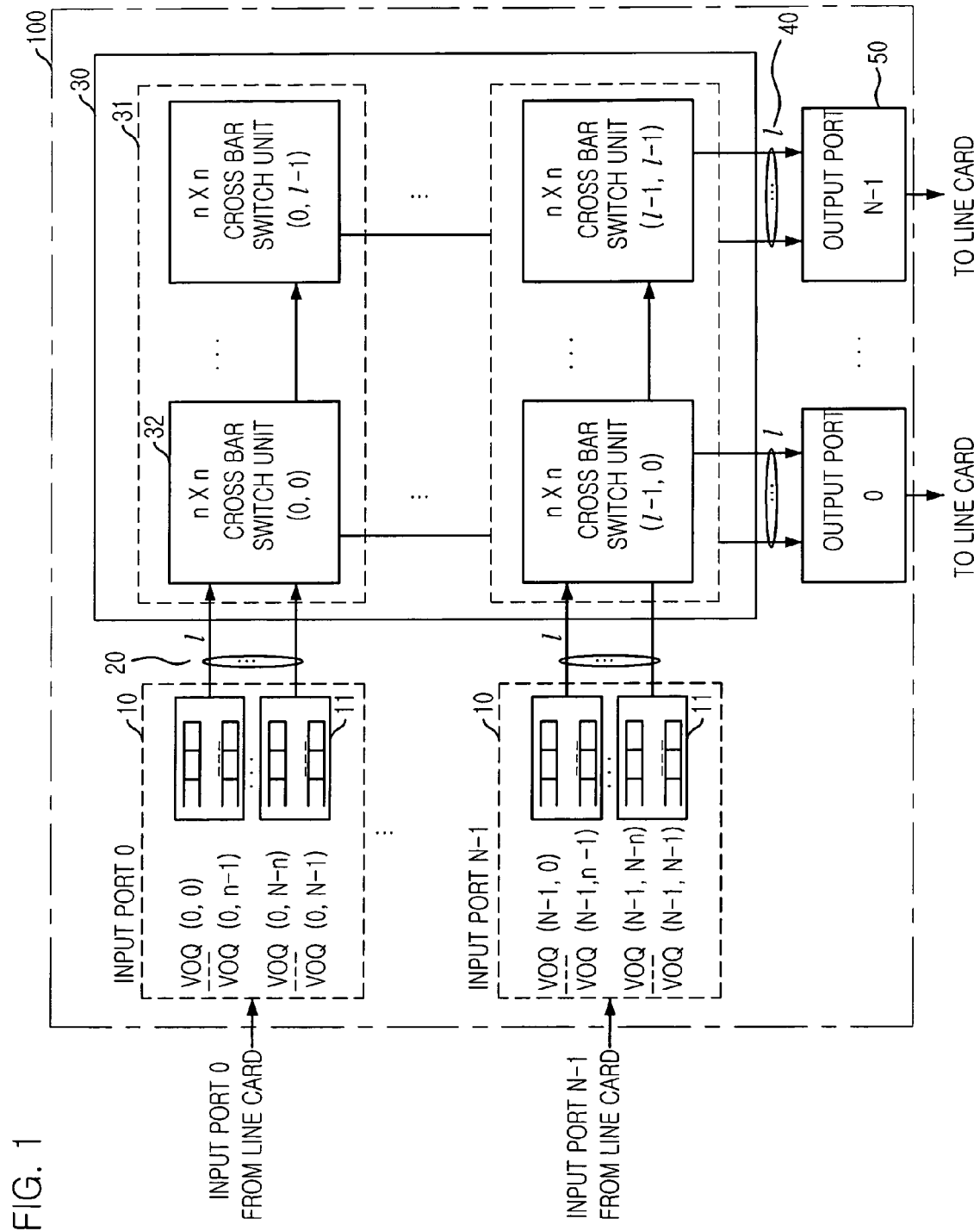
FIG. 1 is a diagram illustrating N×N crossbar matrix switching apparatus in accordance with a preferred embodiment of the present invention.

FIG. 1 is a diagram illustrating N×N crossbar matrix switching apparatus in accordance with a preferred embodiment of the present invention.

As shown, the N×N crossbar matrix switching apparatus 100 includes N number of input ports 10, N number of output ports 50 and N×N switch fabric 30 for transferring a cell from one of the input ports 10 to one of the output ports 50, wherein N is natural number.

Each of the input ports 10 includes N virtual output queues (VOQ). The N VOQs are grouped into l number of VOQ groups 11 and each of VOQ group contains n VOQs, wherein n is a divisor of N and l=N/n. Each of the input ports 10 maximally outputs l cells in a cell time slot.

The N×N switch fabric 30 includes l number of cross switch modules and each cross switch module 32 has l number of cross switch units (XSU). That is, the N×N switch fabric 30 includes l² number of cross switch units (XSU) and each of l² XSUs 31 is connected to each of l VOQ groups 11. The N×N switch fabric 30 schedules cells inputted from N input ports 10 according to each VOQ and outputs the scheduled cell based on a first arbitration function, which is a first stage arbitration.

The N output ports 50 are connected to l XSUs 31. The output port schedules cells according to a second arbitration function, which is a second stage arbitration and transfers maximum one cell by selecting one cell from l XSUs, which is one XSM 32, in a cell time slot.

Each of N input ports 10 includes N VOQ for solving a head-of-line (HOL) blocking problem and the N VOQs are grouped into physically independent l VOQ groups within n VOQs, wherein n is a divisor of N and l=N/n.

The l VOQ groups 11 are connected to l XSMs 32 through l number of switch fabric interface ports 20. Therefore, each of the input ports 10 can transfer maximum l cells to the N×N switch fabric 30 in a cell time slot.

The N×N switch fabric 30 includes l² crossbar units (XSU) 31 and each crossbar unit XSU 31 is connected to n input ports and n output ports. Each XSU 31 effectively transfers a cell inputted from the n input ports 10 to the n output ports 50 according to the first arbitration function, which is the first stage arbitration.

Each output port 50 is connected to physically divided l XSUs 31 through l switch fabric interface ports 40. Each output port 50 effectively transfers maximum one cell to its output link in a cell time slot by selecting a cell according to the second backlog weighed round-robin arbitration function.

Figure 2:
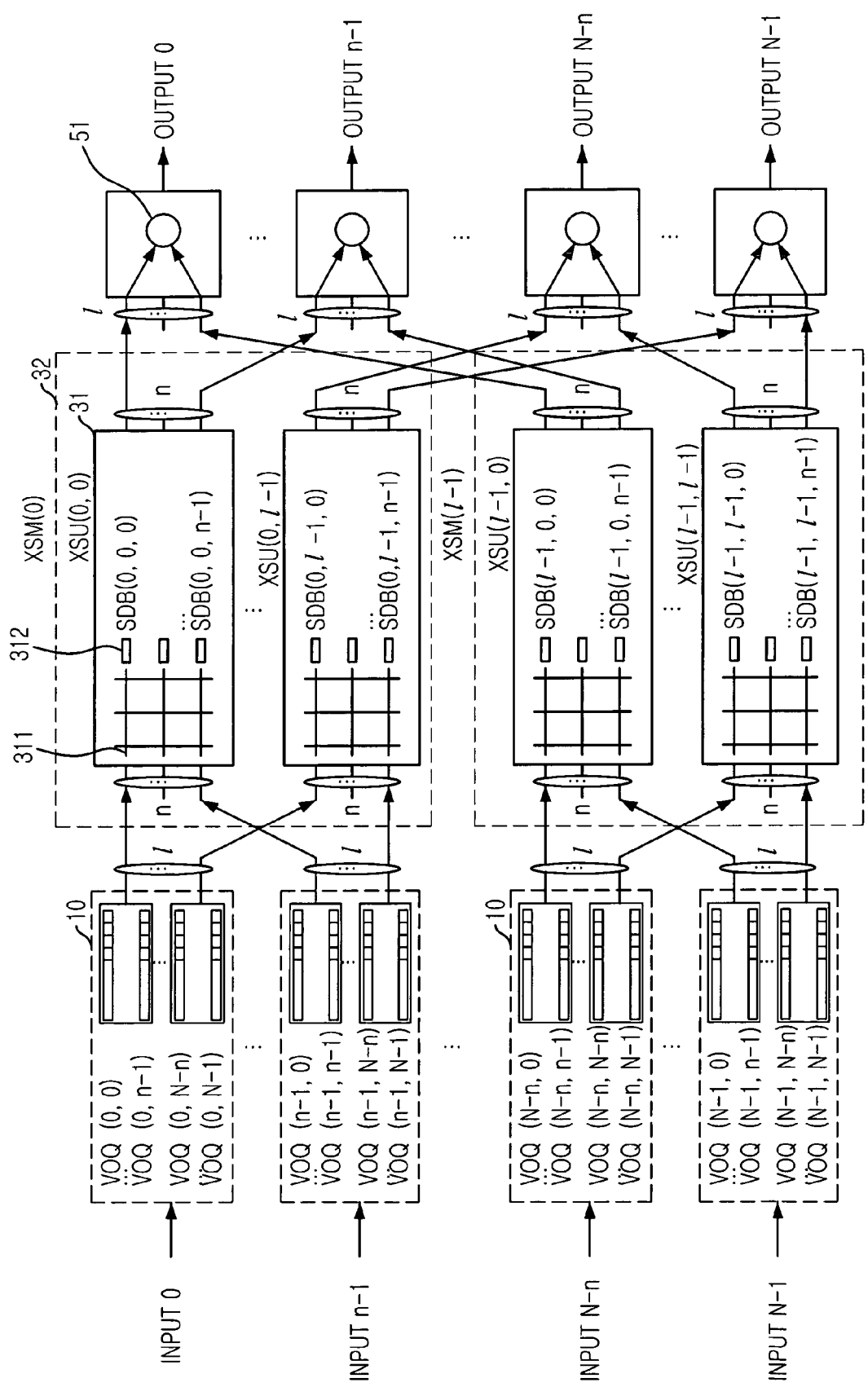
FIG. 2 is a detailed diagram showing connections in a N×N crossbar matrix switching apparatus including l² crossbar switch units in accordance with a preferred embodiment of the present invention.

FIG. 2 is a detailed diagram showing connections in a N×N crossbar matrix switching apparatus including l² crossbar switch units in accordance with a preferred embodiment of the present invention.

As shown, each XSU 31 includes n×n crossbar switch fabric 311 having n crossbar input ports and n crossbar output ports and each output ports includes a scheduling decomposition buffer (SDB) 312, which is one cell size buffer.

Each XSU 31 stores a cell according to the first arbitration function, which is the first stage arbitration, when the SDB 312 can accept the cell.

Various methods can be implemented for the first stage arbitration between the crossbar input ports and the crossbar output ports in the XSU 31, a round-robin based arbitration is the most suitable method for high speed implementation.

Each XSM 32 includes l XSUs 31. Each XSM 32 receives cells from n input ports 10 and transfer the cells to N output ports 50.

Accordingly, N×N metric switch 30 includes l² crossbar switch units 31 since each XSM 32 includes l XSUs 31 and N×N metric switch 30 includes l XSMs 32.

The input ports connected to $m^{th}$ XSM 32 ranges from $(m \times n)^{th}$ input port to $\{m(n+1)-1\}^{th}$ input port.

Therefore, in the present invention, One XSM 32 and n input ports can be constructed as a subsystem. Accordingly, the N×N switch fabric can be physically divided into l subsystems. Therefore, by using the preferred embodiment of the present invention, high capacity switch can be constructed in modular type which was conventionally constructed as multi-rack.

Each output port 50 does not have any memory device to buffer cells, which is a memory-less type, and outputs maximum one cell in a time slot by selecting one cell from l SDBs 312 by each output arbiters 51.

The SDBs 312 that belongs to the $j^{th}$ output port 50 can be expressed as:

$$\sum_{m=0}^{l-1} SDB\left(m, \left\lfloor \frac{j}{n} \right\rfloor, j \bmod n\right) \quad \text{Eq. 1}$$

The output arbiter 51 can be implemented by various arbitration methods but a round-robin is the most effective way for high speed implementation. Therefore, in the preferred embodiment of the present invention, a backlog weighted round-robin based arbitration function is used as the second arbitration function, which is the second state arbitration.

As mentioned above, in the present invention, there are two stages for arbitration between input ports 10 and output ports 50 in N×N crossbar matrix switching apparatus, which consists of two stage distributed arbitrations including the first stage arbitration and the second stage arbitration The first stage arbitration is performed in each of distributed XSUs 31 and the second stage arbitration is performed in each of distributed output ports 50. They operate independently of each other and are concurrently performed. Also, in each of the stages, there is no internal speed-up.

The first stage arbitration (first arbitration function) is an extended arbitration of "iSLIP" and performs the arbitration by using a credit information, which is a state information of an SDB 312. The credit bit is set to "0" when the SDB 312 can accept a cell or else "1".

The first stage arbitration in XSU 31 includes three steps as follows.

At the first step, non-empty VOQs send a request to every output port arbiter in each time slot.

At the second step, each output port arbiter chooses one request in a round-robin fashion starting from the highest priority elements if its credit value is 0. It then sends the grant signal to the selected VOQ. The grant pointer is incremented (mod n) by one beyond the granted input if and only if the grant signal is accepted at the third step.

At the third step, if an input receives grants, it accepts the one in a round-robin fashion starting from the highest priority elements. The accept pointer is incremented (mod n) by one beyond the accepted output.

The first arbitration (first arbitration function) is performed by each XSUs and will be explained with FIGS. 3 to 8 in detail.

The second stage arbitration, which is performed by each output ports, includes two steps as follows.

At the first step, non-empty SDBs 312 send a request to every output port arbiter in each time slot.

At the second step, each output port arbiter 51 chooses one request in a round-robin fashion starting from the highest priority elements. The output port arbiter pointer is incremented (mod l) by one beyond the accepted SDB 312.

However, the second stage arbitration may cause unfairness problem when input traffic is non-uniform. It will be explained in detail by referring to FIG. 9 and also a backlog weighted round-robin is explained by referring to FIGS. 10A to 10C in later. Furthermore, the second stage arbitration is explained by referring to FIGS. 11 to 12 in detail.

Figure 3:
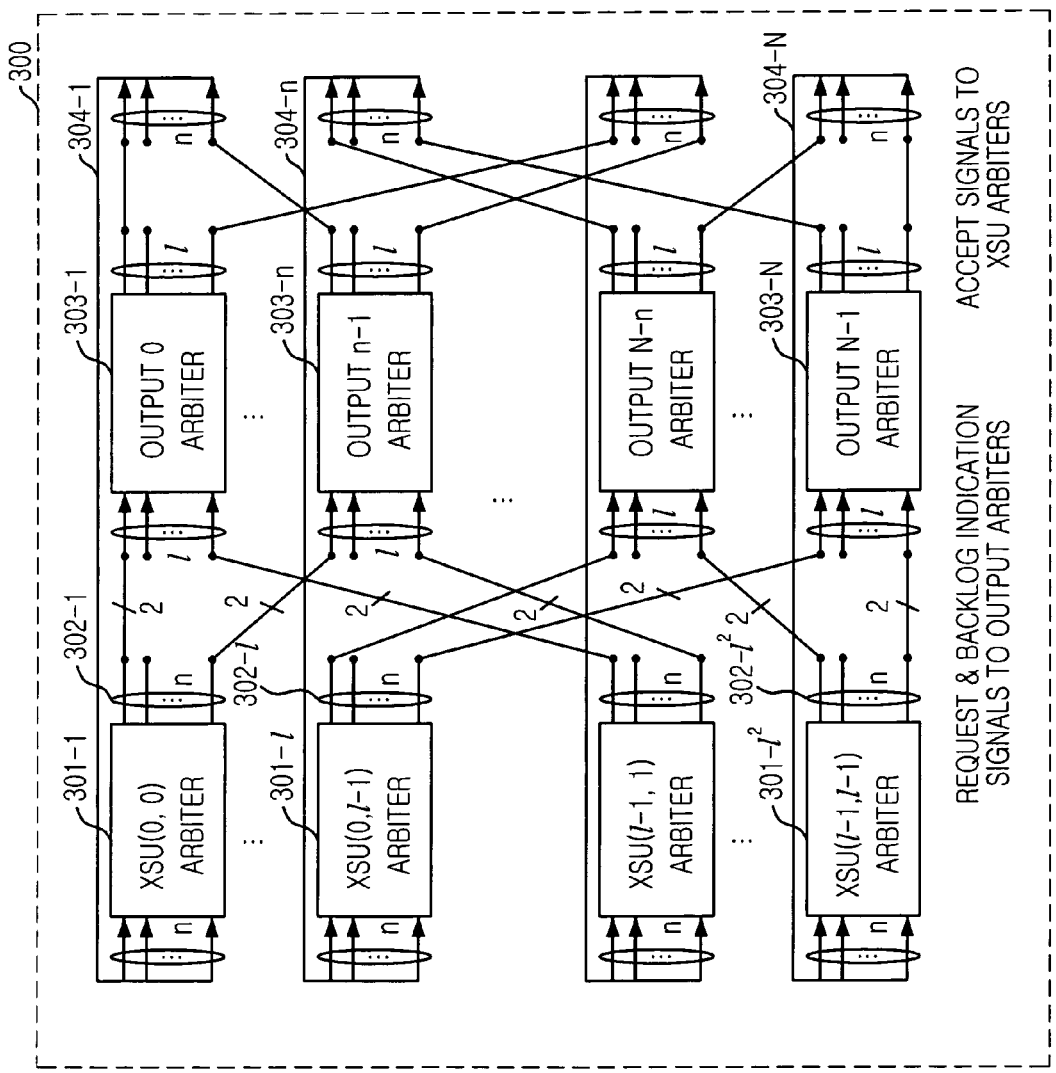
FIG. 3 is a diagram depicting arbiters in a N×N crossbar matrix switching apparatus in accordance with a preferred embodiment of the present invention.

FIG. 3 is a diagram depicting arbiters in a N×N crossbar matrix switching apparatus in accordance with a preferred embodiment of the present invention.

As shown, the arbiter 300 includes $l^2$ distributed crossbar switch unit (XSU) arbiters 301-1 to 301-$l^2$ and N distributed output arbiter 303-1 to 303-N.

A request and a backlog indication signal outputted from each of XSU arbiters 301-1 to 301-$l^2$ are transferred to the output arbiters 303-1 to 303-N. The output arbiters 303-1 to 303-N output accept signals to the XSU arbiters 301-1 to 301-$l^2$.

As shown in FIG. 3, the N×N crossbar matrix switching apparatus arbitrates cells by using the $l^2$ distributed XSU arbiters 301-1 to 301-$l^2$ for performing the first stage arbitration and the N distributed output arbiter 303-1 to 303-N for performing the second stage arbitration. Each XSU arbiter can be constructed by n distributed grant arbiters and n distributed accept arbiters. Therefore, the scalability for large scale switching fabric can be increased in the present invention.

The first stage arbitration is explained by referring to the FIGS. 4 to 8 hereinafter.

Figure 4:
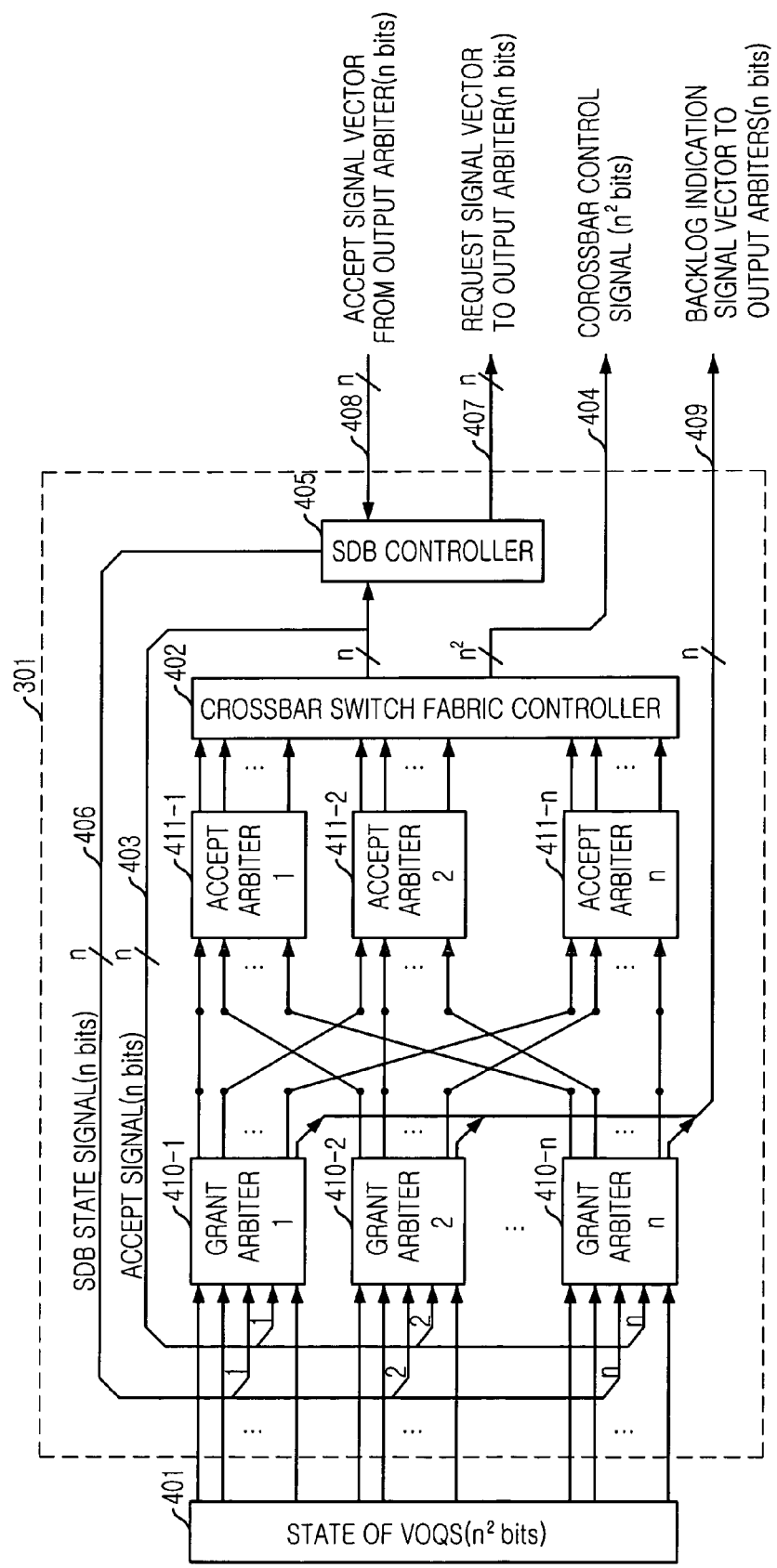
FIG. 4 is a diagram showing a crossbar switch unit (XSU) arbiter in accordance with a preferred embodiment of the present invention.

FIG. 4 is a diagram showing a crossbar switch unit (XSU) arbiter in accordance with a preferred embodiment of the present invention.

As shown, the XSU arbiter 301 consists of n distributed grant arbiters 410-1 to 410-n, n distributed accept arbiters 411-1 to 411n, a crossbar switch fabric controller 402 and an SDB controller 405.

The state of VOQs 401 is $n^2$ bits of information indicating the current state of VOQs from input ports 10 connected to an XSU 31. If a VOQ is non-empty, the corresponding state bit in the state of VOQs 401 is set to "1", or else "0".

Each of the grant arbiters 410-1~410-n receives n bits of request signal vector from the state of VOQs 401, generates n bits of grant signals and transfers it to the accept arbiters 411-1 to 411-n. Furthermore, each grant arbiter generates n bits of backlog indication signal vector 409 and sends it to output arbiters 303.

Each of the accept arbiters 411-1 to 411-n receives n bits of grant signal vector, generates n bits of accept signals and sends it to the crossbar switch fabric controller 402.

The crossbar switch fabric controller 402 generates $n^2$ bits of crossbar control signals 404 for controlling each crosspoint of n×n crossbar switch fabric and n bits of accept signals 403 for each of the grant arbiters 410-1 to 410-n.

The SDB controller 405 receives n bits of accept signals 403 from the crossbar switch fabric controller 402, generates n bits of request signal vector to output arbiters 407, and is notified n bits of accept signal vector 408 by output port arbiters The SDB controller 405 identifies the current state of each SDBs 312 and generates n bits of SDB state signals 406. The current state of each SDB 312 can be identified by accept signals from output port arbiters 408 and the crossbar switch fabric controller 402. That is, an SDB for taking out a cell in current time slot is identified by the accept signal vector from output port arbiters 408, and an SDB for storing the cell in current time slot is distinguished by the accept signals 403 from the crossbar switch fabric controller 402. The state of an SDB is set to "0" when the SDB can store a cell, or else "1".

Figure 5:
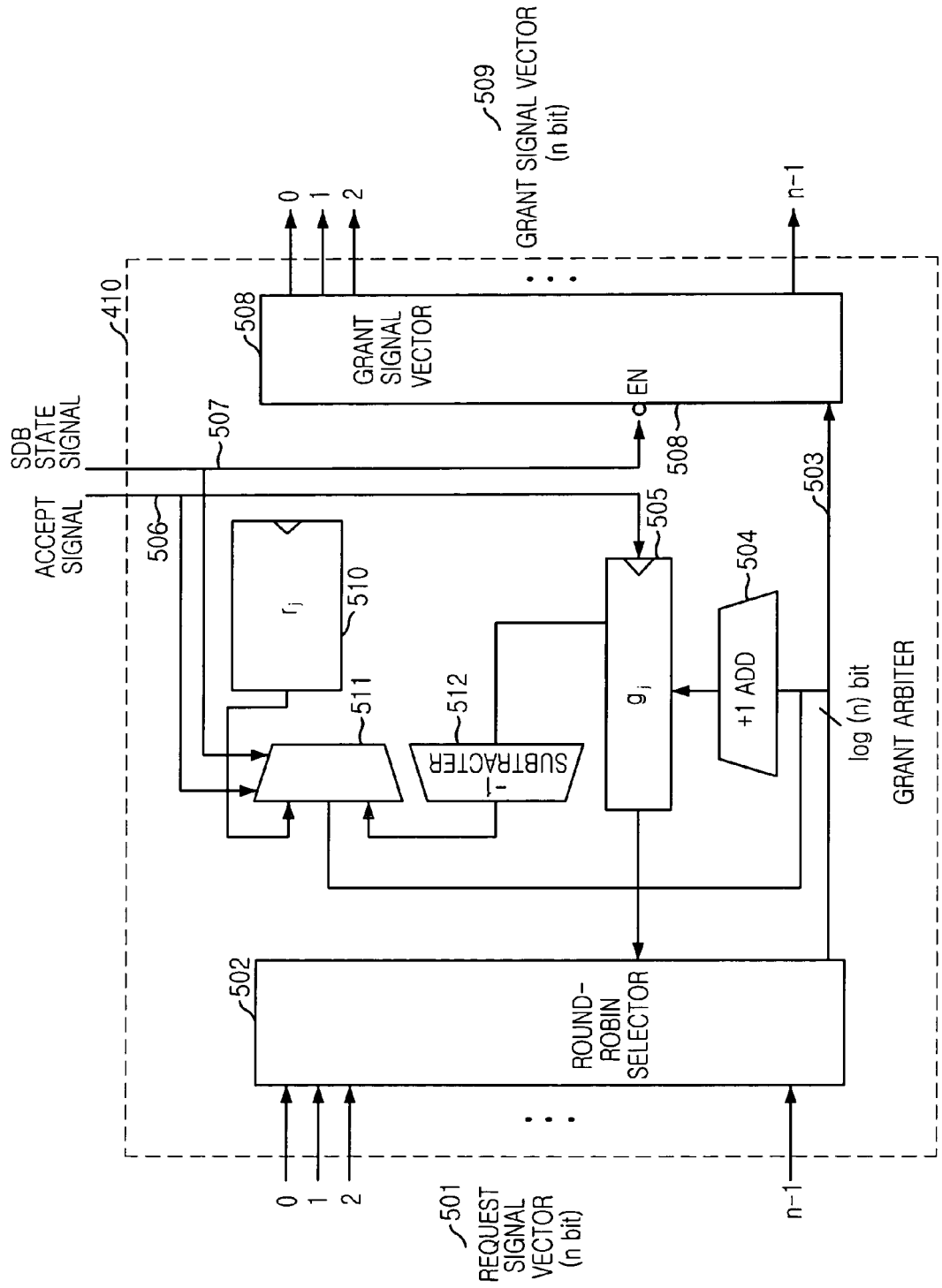
FIGS. 5 and 6 are detailed diagrams illustrating the grant arbiter 410 in FIG. 4.
Figure 6:
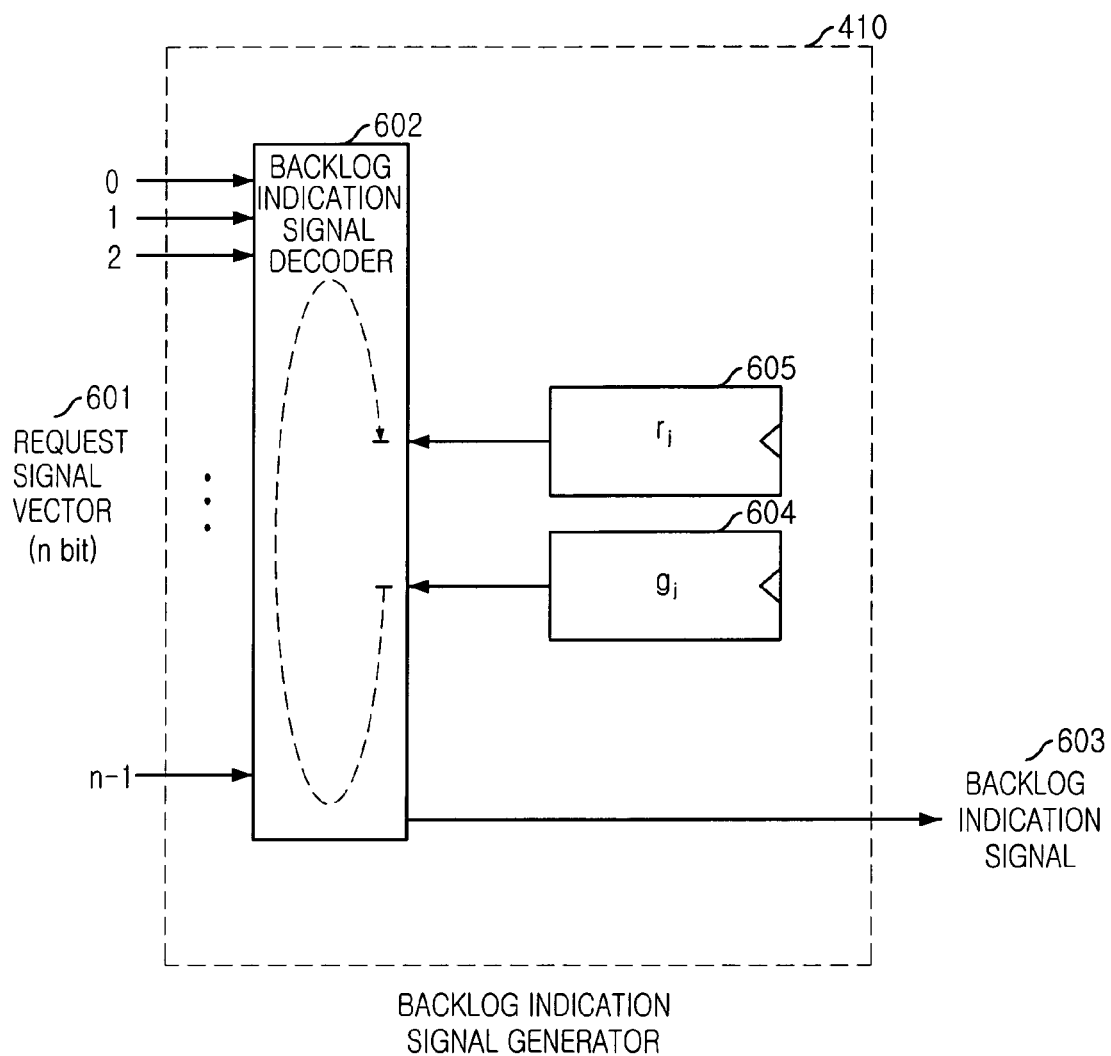
Figure 7:
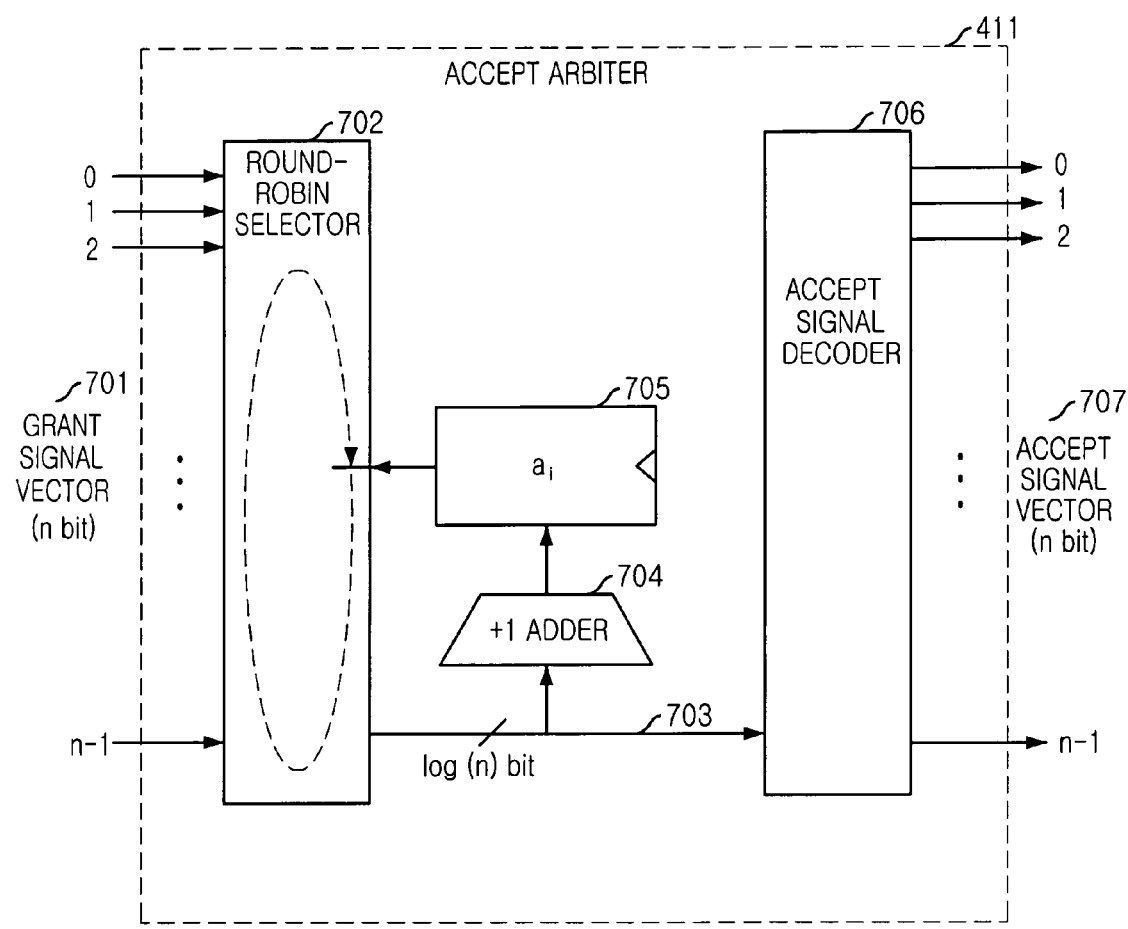
FIG. 7 is a diagram illustrating an accept arbiter in accordance with a preferred embodiment of the present invention.

The grant arbiters and the accept arbiters are explained in detail by referring the FIGS. 5 to 7.

FIGS. 5 and 6 are detailed diagrams illustrating the grant arbiter 410 in FIG. 4.

As shown in FIGS. 5 and 6, when the n bit request signal vector 501 is transferred to the grant arbiter 410, the request signal vector 501 is connected to a round robin selector 502 in the grant arbiter 410. The request signal vector 501 includes n bits and represents request signals from input ports to an output port of an XSU 31.

The round robin selector 502 selects the first request signal among the request signal vector 501 in round robin fashion starting from the $g_j^{th}$ request signal. The round robin selector 502 outputs log(n) bits of selection signal 503 as a result of the selection. The log(n) bits of signal 503 represents the position information of an input port selected by the grant arbiter 410. An adder 504 adds 1 to the log(n) bit position information 503 by mod n and sends the result value to the grant arbiter register $g_j$ 505.

The grant arbiter register $g_j$ 505 updates its value by the value from the adder 504 only when the accept signal is received, or else it keeps the previous value. The accept signal 503 notices the grant signal generated by the grant arbiter is accepted.

The round robin selector 502 transfers log(n) bits of the selection signal to a grant signal decoder 508. The grant signal decoder 508 generates n bits of grant signal vector 509 based on the SDB state signal 507. As mentioned above, the SDB state signal represents states of the SDB. If the SDB state signal includes the state of SDB as "0", the SDB can receive a cell and if the SDB state signal includes the state of SDB as "1", the SDB cannot receive a cell.

Accordingly, the grant signal decoder 508 sets the grant signal vector 509 to all "0" if the SDB stat signal having "1". Furthermore, the grant signal decoder 508 sets only one bit selected by the round robin selector 502 to "1" and remaining bits to "0" when the SDB state signal is "0". That is, the grant signal is generated by selecting one signal among n bit request signal vector 501 when the SDB of output port can receive a cell.

A window reference pointer $r_j$ 510 updates its value from the output of selector 511 in every time slot.

The selector 511 selects its output according to the state of the accept signal 506 and the SDB state signal 507 as follows.

In a case of the SDB state signal includes "0" as the state value of the SDB (when an SDB is empty in the previous time slot and the accept signal 506 is received), the window start pointer $r_j$ 510 is set as log(n) bits 503, which is the input port number selected by the grant arbiter 410. The size of backlog measurement window becomes maximum since the grant arbiter register $g_j$ 505 is set to $r_j+1$ (mod n).

In a case of the SDB state signal including "1" as the state value of the SDB (the SDB is non-empty in the previous time slot and the accept signal is received in the current time slot), the window start point $r_j$ 510 is maintained as its previous value. If this case is repeated, the size of the backlog measure window becomes decreased.

In a case of the SDB state signal including "1" as the state value of the SDB (the SDB is non-empty in the previous time slot and the accept signal is not received in the current time slot), the window start point $r_j$ 510 is set to $g_j-1$ (mod n). In this case, the size of backlog measurement window becomes maximum size.

FIG. 6 is a diagram illustrating the grant arbiter 410 in accordance with a preferred embodiment of the present invention.

As shown, when a request signal vector 601 is transferred to the grant arbiter 410 of the XSU 31, the request signal vector 601 is connected to the backlog indication signal decoder 602. The request signal vector 601 includes n bit request signals transferred to an output port.

The backlog indication signal decoder 602 sets the backlog indication signal 603 to "1" if there is more than one request signal set to "1" among request signals between the $g_j^{th}$ request signal and the $(r_j-1)^{th}$ request signal.

The backlog indication signal 603 can be expressed by the following equation:

$$BI_j = \begin{cases} 0 & \text{when } BW_j = 0 \\ 1 & \text{else} \end{cases} \qquad \text{Eq. 2}$$

In the Eq. 2, $BI_j$ is a backlog indication signal generated by the $j^{th}$ output port of an XSU, and $BW_j$ is a backlog weights measured by the $j^{th}$ output port of an XSU. $BW_j$ is the number of request signals set to "1" among request signals between the $g_j^{th}$ request signal and the $(r_j-1)$th request signal. $BI_j$ is set to "0" when $BW_j$ is 0 and otherwise $BI_j$ is set to "1".

FIG. 7 is a diagram illustrating an accept arbiter in accordance with a preferred embodiment of the present invention.

As shown, the n bits of grant signal vector 701 is connected to the round robin selector 702. Each bit of the grant signal vector 701 represents a grant signal transferred to an input port from an output port of an XSU.

The round robin selector 702 selects the first grant signal among the n bit grant signal vector 701 in round robin fashion from the $a_i^{th}$ grant signal.

And, the round robin selector 702 outputs log(n) bits of selection signal as a result of round robin selection. The selection signal 703 represents the position information of an output port selected at the accept arbiter 411. An adder 704 adds 1 to the position information 703 and sends it to the accept arbiter register $a_i$ 705.

The selection signal 703 from the round robin selector 702 is transferred to the accept signal decoder 706. The Accept signal decoder 706 generates n bits of accept signal vector 707 by setting one bit corresponding to log(n) bits of the selection signal 703 to "1" and remaining bits to "0".

As mentioned above, the grant arbiter 410 and the accept arbiter 411 performs the first stage arbitration. The first stage arbitration is explained by referring to FIG. 8 in detail.

Figure 8:
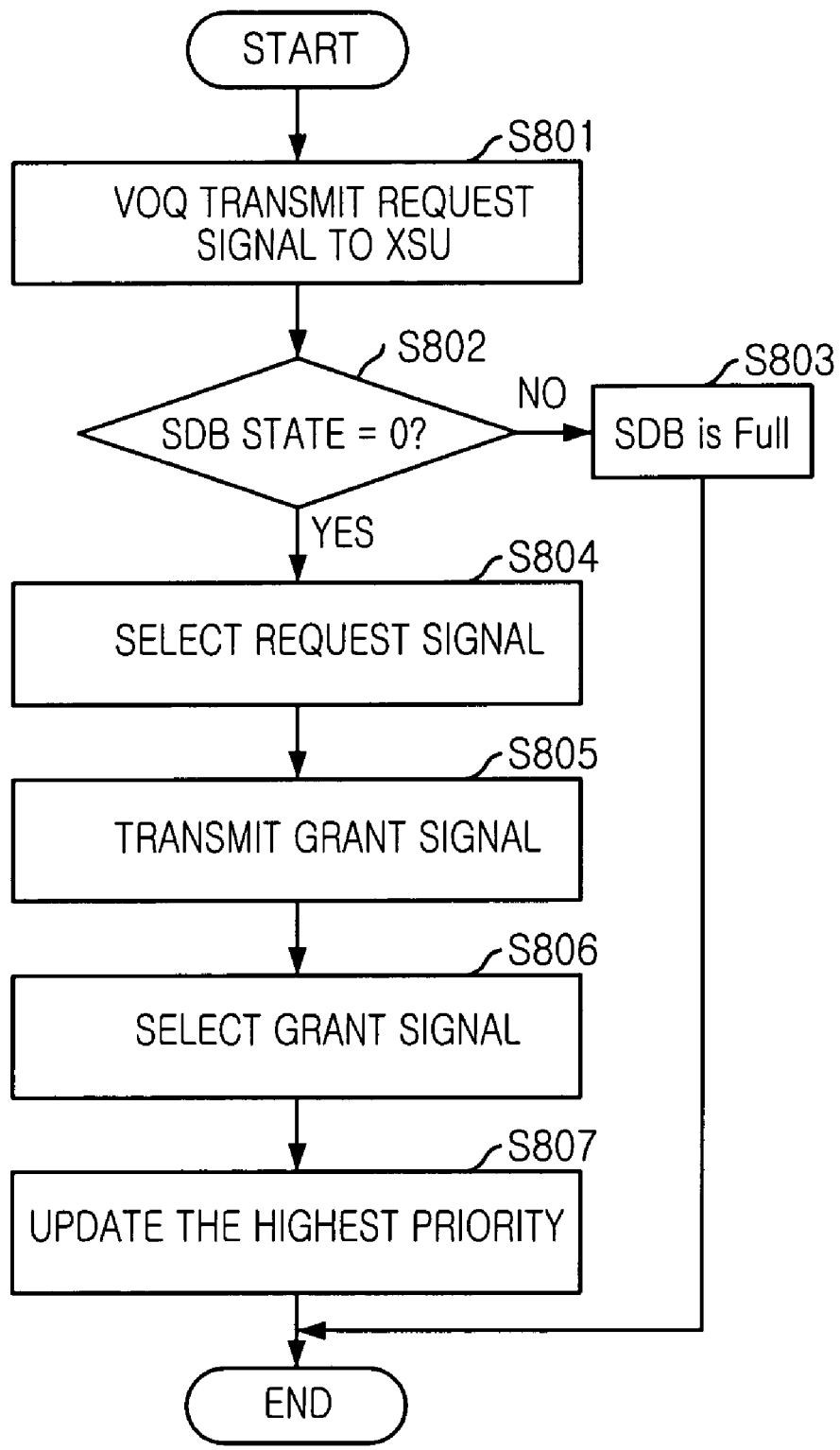
FIG. 8 is a flowchart illustrating a first stage arbitration for distributed scheduling in accordance with a preferred embodiment of the present invention.

FIG. 8 is a flowchart illustrating the first stage arbitration in an XSU in accordance with a preferred embodiment of the present invention.

As shown, at step S801, non-empty VOQs in each input ports send a request signal to grant arbiters in an XSU and each grant arbiter determines the state of an SDB at step S802.

If the SDB state is not 0, each grant arbiter denies the request at step S803 since the SDB is full. In this case, the value of the highest priority register is remained.

If the SDB state is 0, each grant arbiter selects one of request signals based on round robin method by searching the request signals from the highest priority at step S804 and transmits a grant signal to the corresponding accept arbiter at step S805.

Each accept arbiters of an XSU selects one of the granted signals based on round robin method by searching the grant signals from the highest priority at step s806. The highest priority registers in the XSU are updated at step s807

When input traffic is non-uniform, the second stage arbitration may generate unfairness problem. It is explained in detail hereinafter.

FIG. 9 shows XSU arbiters perform the second stage arbitration when an input traffic is non-uniform.

As shown, the XSU (0,0) arbiter 901 and the XSU (1,0) arbiter 902 are arbiters for 2×2 crossbar switch unit which is a building unit for 4×4 crossbar matrix switch.

$\lambda_{i,j}$ is an arrival rate from an input port i to an crossbar output port j and $\mu_{i,j}$ is a service rate from an crossbar output port j to an input port i.

As shown in FIG. 9, the input port 903 has $\lambda_{0,0}=0.5$ and $\lambda_{0,1}=0$, the input port 904 has $\lambda_{1,0}=0.5$ and $\lambda_{1,1}=0.5$, the input port 905 has $\lambda_{2,0}=0.5$ and $\lambda_{2,1=0.5}$ and an input port 906 has $\lambda_{3,0}=0.5$ and $\lambda_{3,1}=0.5$. It shows that input traffics are non-uniformly distributed. Let's assume that the scheduling method is based on a pure round robin method at the output port 907 and 908. The output port 907 has the same service rates for input ports that have identical arrival rates. However, in the case of output port 908, it has different service rates for input ports that have the same arrival rate. That is an unfairness problem.

For solving the unfairness problem, a weighted round robin method is used for each output port. Therefore, for measuring a backlog traffic weight of each output port, the backlog traffic weight is defined as:

$$BW_j = \sum_{i \in W_j} R_{i,j} \qquad \text{Eq. 3}$$

In Eq. 3, $BW_j$ is a backlog weight measured at an output port j. $R_{i,j}$ is 1 when there is a backlog traffic from an input port i to an crossbar output port j and is 0 when there is no backlog traffic from an input port i to an output port j. It is identical to the request signal generated by a non-empty VOQ at the first stage arbitration. Also, $W_j$ is a backlog weight measure window representing the set of input ports which are the object of backlog traffic measurement at the output port j.

Figure 10A:
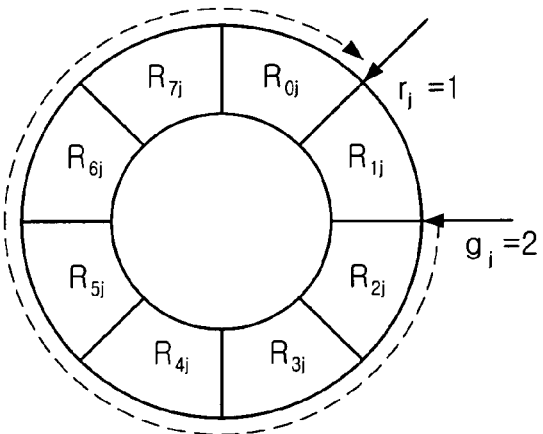
FIGS. 10A to 10C are views for explaining a method for measuring a backlog weight in accordance with a preferred embodiment of the present invention.
Figure 10B:
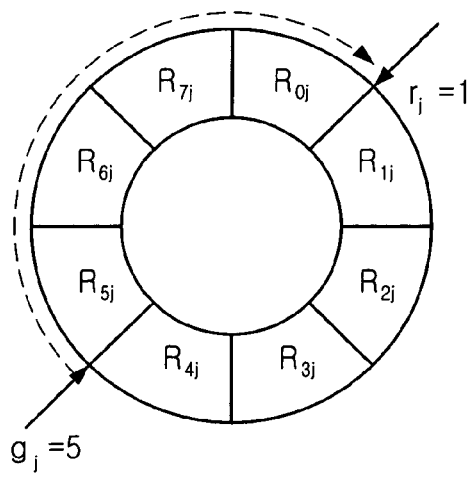
Figure 10C:
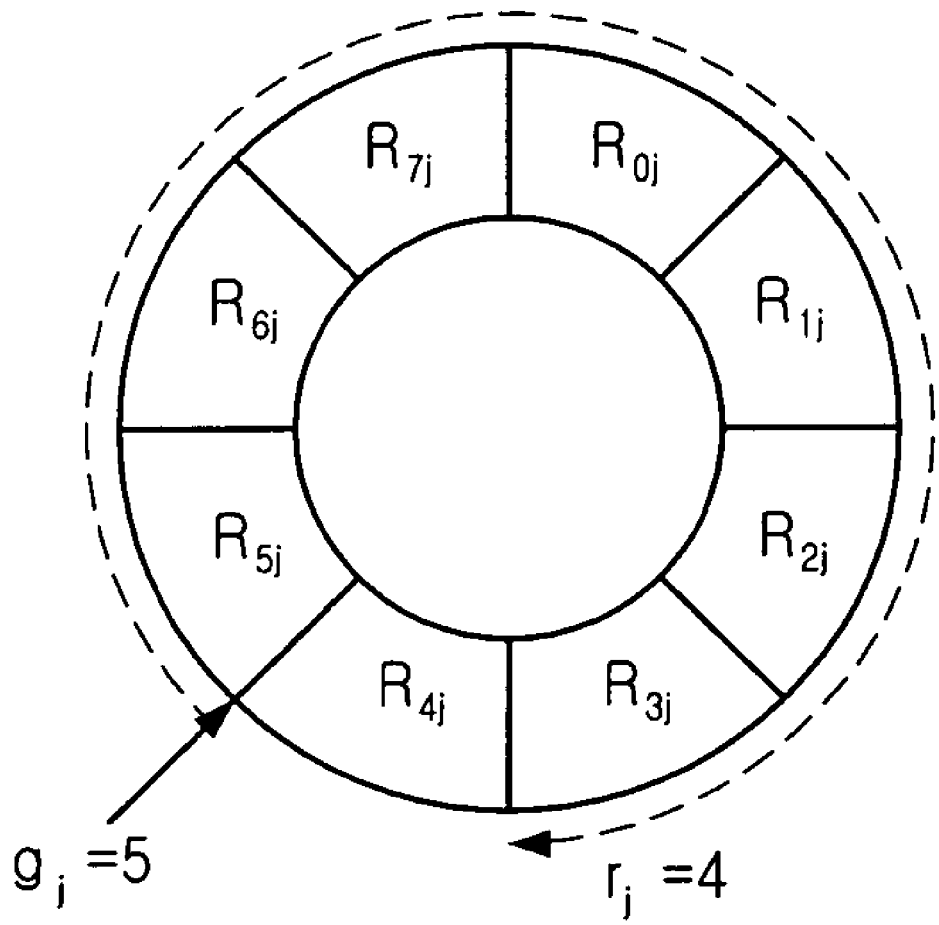

FIGS. 10A to 10C are views for explaining a method for measuring a backlog weight at the output port j of an 8×8 XSU in accordance with a preferred embodiment of the present invention.

Referring to FIGS. 10A to 10C, $r_j$ is a reference point of a backlog weight measure window and $g_j$ is a value of a grant arbiter pointer corresponding to an crossbar output port j of each XSU 31 that represents a starting point of the backlog weight measure window. Also, $R_{i,j}$ is "1" when there is the backlog traffic from the input port i to the crossbar output port j.

A value of $r_j$ is set as the number of crossbar input port when the SDB of the crossbar output port j is empty in the previous time slot and is non-empty in the current time slot. Also, the value of $r_j$ is set to $g_j-1 \pmod{n}$ when the SDB is non empty in the previous time slot and the crossbar output port j does not receive an accept signal from the output arbiter in the current time slot. Moreover, the value of $r_j$ is maintained as a previous value when the SDB is non-empty and the crossbar output port j receives the accept signal from the output arbiter.

FIG. 10A shows the value $r_j$ becomes 1 and $g_j$ becomes 2 when an SDB of an crossbar output port j is empty in the previous time slot and a cell is received from an input port 1 based on the first stage arbitration.

A backlog weight measure window is $W_j=\{0,2,3,4,5,6,7\}$ and the backlog weights excepting the input port 1 transferring the cell in SDB is measured. In this case, the size of the backlog weight measure window becomes maximum.

FIG. 10B shows a case that an SDB is non-empty in the previous time slot and an accept signal is received from the output arbiter in the current time slot. In the above mentioned case, the crossbar output port j transfers the cell from input port 1 and receives a new cell from the input port 4 for storing the cell in the SDB. In this case, $r_j$ is maintained as 1 and $g_j$ is set to 5. So the backlog weight measure window becomes $W_j=\{0,5,6,7\}$. That is, the size of the backlog weight measure window is decreased when an output port j of an XSU transfers cells to the output port 30 consecutively.

According to the present invention as mentioned above, maximum 8 cells can be sent to the output port 50 to prevent an XSU to monopoly an output port 50, even if the SDB is maintained as non-empty state.

FIG. 10C shows the case that an SDB is in a non empty state in the previous time slot and the cell in the SDB can not be sent to an output port 30 in the current time slot. $r_j$ is set to "4", which is $g_j-1$, $g_j$ is maintained as "5".

A backlog weight measure window is $W_j=\{0,1,2,3,5,6,7\}$ and backlog weights of ports excepting input port 4 which transferred a cell in the SDB are measured. The size of the backlog weight measure window becomes maximum in this case.

In a case that a crossbar output port j sends a backlog weight value to an output arbiter, the number of interconnection signals between an XSU and an output port are increased and a scalability problem arises for large scale switch implementation. In the above mentioned case, one bit backlog indication signal is transferred to output ports instead of backlog weight. The backlog indication signal is generated according to Eq. 2.

The second stage arbitration based on the backlog weighed round robin is performed by distributed output arbiters 51 and includes two steps.

At the first step, non-empty SDBs 312 send a request to every output port arbiter in each time slot.

At the second step, each output port arbiter 51 chooses one request in a round-robin fashion starting from the highest priority elements. The output port arbiter pointer is incremented (mod l) by one beyond the accepted SDB 312.

Figure 11:
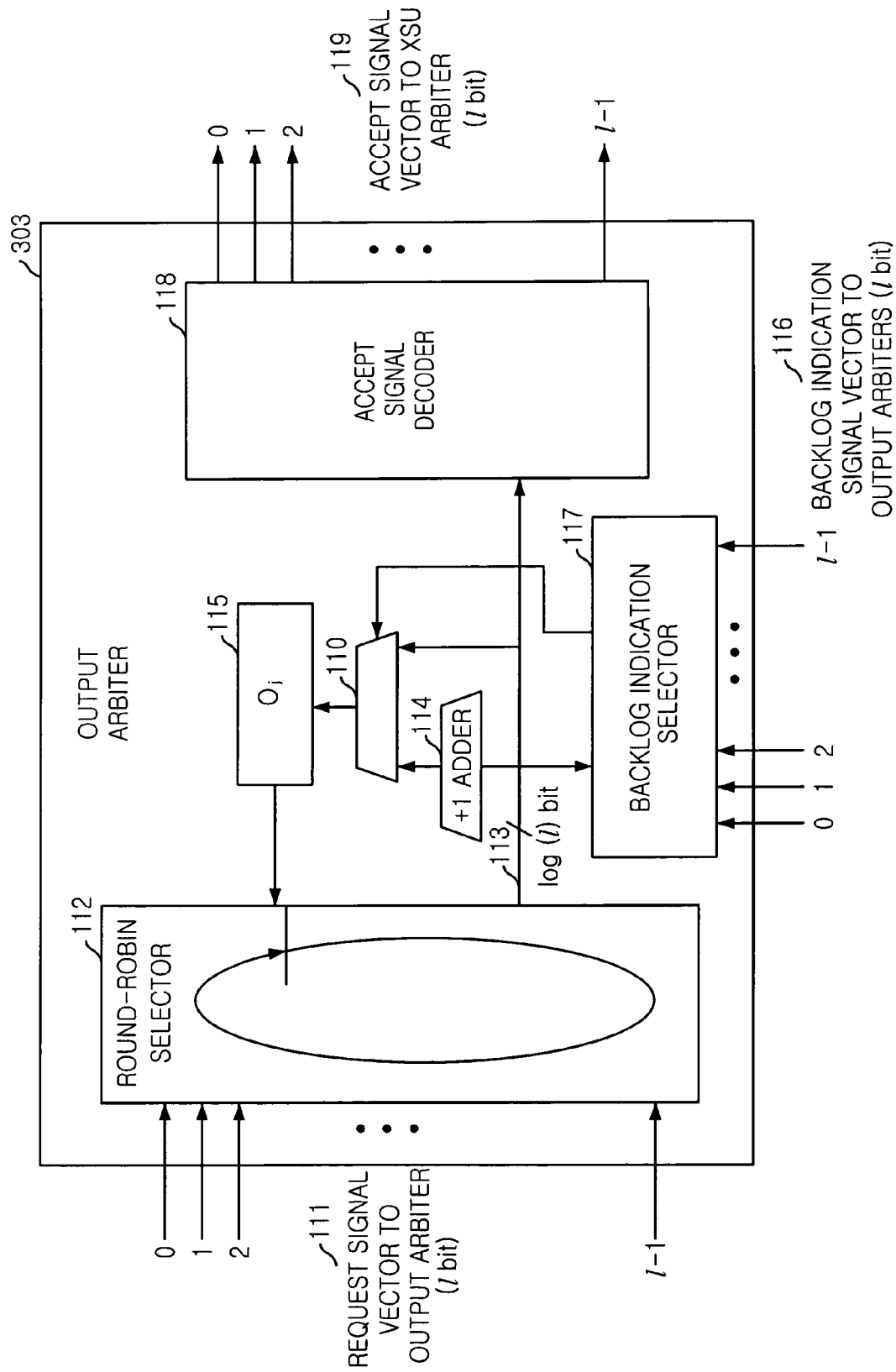
FIG. 11 is a diagram illustrating an output arbiter in FIG. 3.

FIG. 11 is a diagram illustrating an output arbiter in FIG. 3.

When a request signal vector 111 from each XSU 31 is transferred to the output arbiter 303 in an output port 50 in FIG. 1, the request signal vector 111 is connected to the round-robin selector 112. The request signal vector includes l bits and represents request signals transferred from l XSUs to the output arbiter 303.

The round-robin selector 112 selects the first request signal among l bits of request signal vector 111 in round robin method starting from the $o_j^{th}$ request signal. After selecting, the round-robin selector 112 generates log(l) bits of selection signal 113 and send it to the accept signal selector 118. The selection signal 113 represents position information of an XSU selected by an output arbiter 303.

A backlog indication selector 117 transfers the state of backlog indication signal from an XSU selected by the round robin selector 112. If there is backlog traffic, the selector 110 outputs the selection signal 113. If there is no backlog traffic, the selector 110 outputs the selection signal +1 (mod l) signal generated by the +1 adder 114.

The output arbiter register $o_j$ 115 stores the value transferred by the selector 110, which is the highest priority location information.

The accept signal decoder 118 generates l bits of accept signal vector 119 by setting one bit "1" corresponding to the output of the round robin selector 112 and remaining bits "0".

Figure 12:
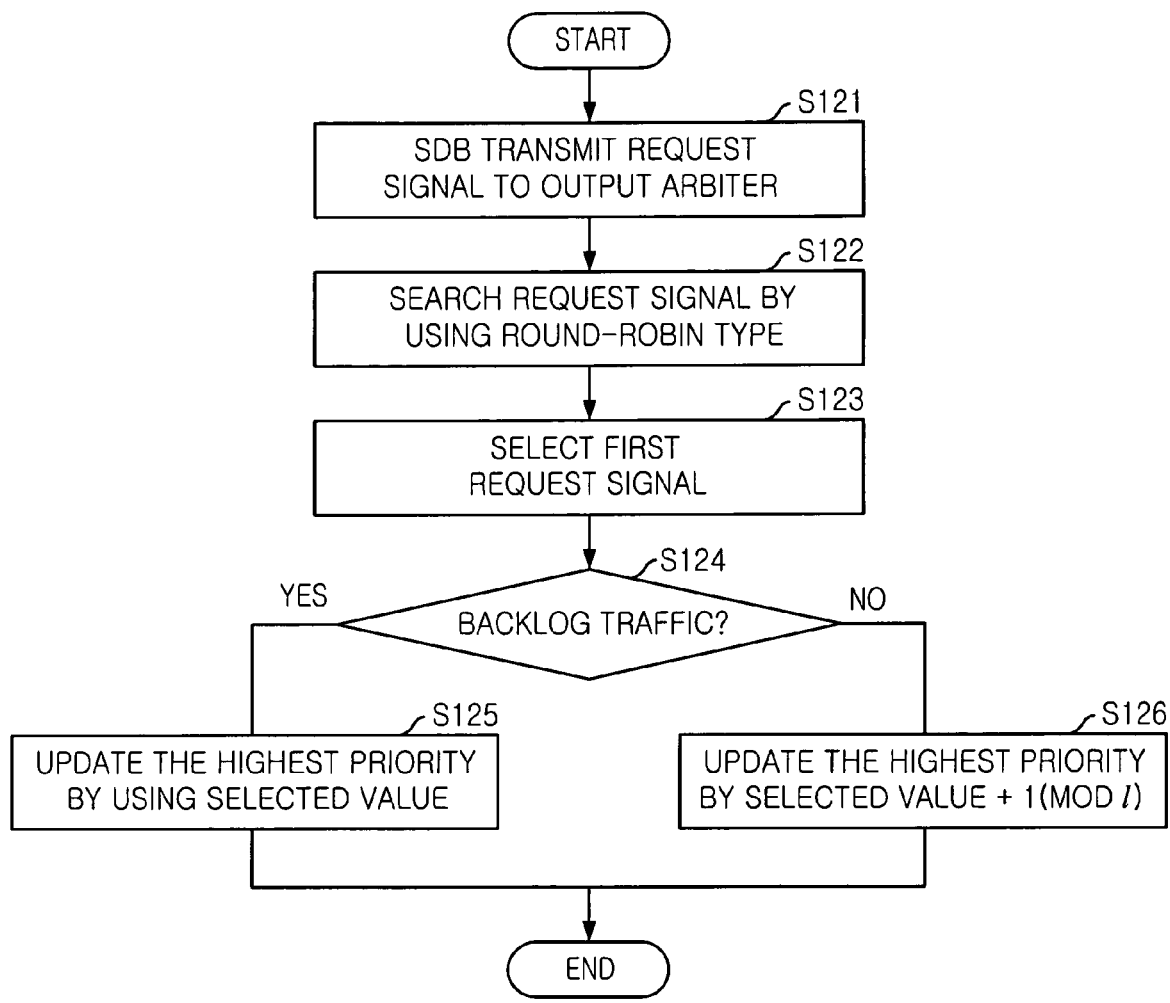
FIG. 12 is a flowchart showing an arbitration in an output port for distributed scheduling in accordance with a preferred embodiment of the present invention.

FIG. 12 is a flowchart showing the second arbitration in an output port arbiter 303 for distributed scheduling in accordance with a preferred embodiment of the present invention.

As mentioned above, the second arbitration is performed independently between output port arbiter 303.

Accordingly, if an XSU arbiter 301 transfers a request signal at step S121, an output arbiter 303 in the output port 51 searches request signals from the highest priority based on the round robin at step 122. A request signal which is firstly requested is selected at step S123.

When the request signal is accepted, the output arbiter checks the backlog state of the selected XSU at step S124.

If there is backlog traffic, the highest priority is updated as the selected value at step S125. If there is no backlog traffic, the highest priority is updated by selected value +1 (mod l) at step S126.

As mentioned above, the present invention provides less time delay for transferring cells comparing to PIM or iSLIP and has 100% throughput. Also, the present invention provides improved throughput comparing to PIM and iSLP in a case of non-uniform traffic. Furthermore, the present invention better arbitration time margin comparing than the PIM and iSLP.

The above mentioned method of the present invention can be implemented as a set of executable instructions and the set of executable instruction can be stored in a computer readable recording medium such as a floppy disk, a hard disk, a CD-ROM, a RAM, a ROM and an optical magnetic disk.

The present invention contains subject matter related to Korean patent application No. KR 2004-0052278, filed in the Korean patent office on Jul. 6, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A high capacity switching apparatus, comprising:

N input ports each of which for outputting maximum l cells in a time slot, wherein each of the N input ports includes N virtual output queues (VOQs) which are grouped in l virtual output queue groups with n VOQs in each group;

N×N switch fabric having $l^2$ crossbar switch units (XSUs) for scheduling cells inputted from N input ports based on a first arbitration function based on a round-robin, wherein l VOQ groups are connected to l XSUs; and N output ports each of which connected to l XSUs for selecting one cell from l XSUs in a cell time slot by scheduling cells by a second arbitration function based on a backlog weighed round-robin, which operates independently of the first arbitration function, and transferring the selected cell to its output link, wherein each of N output ports is memory-less type and a cell is selected from scheduling decomposition buffers (SDBs) of the XSUs by an output arbiter in a time slot, a maximum one cell is selected from l SDBs by the output arbiter in a time slot and the SDBs that belongs to the $j^{th}$ output port can be expressed as:

$$\sum_{m=0}^{l-1} SDB\left(m, \left\lfloor \frac{j}{n} \right\rfloor, j \bmod n\right).$$

2. The apparatus of claim 1, wherein each of the XSUs includes n×n crossbar switch fabric having n crossbar input ports and n crossbar output ports and one cell size scheduling decomposition buffers (SDBs) at each of n crossbar output ports, and stores a cell temporarily into the SDB by the first arbitration function which runs independently between each XSUs.

3. The apparatus of claim 1, wherein the l XSUs are constructed as one crossbar switch module (XSM), wherein the XSM transfers cells inputted from n crossbar input ports to N output ports.

4. The apparatus of claim 1, wherein the first arbitration function is performed by arbiters in each XSUs, wherein the XSU arbiter includes:

$n^2$ bits of VOQs state information indicating the current state of VOQs from input ports connected to an XSU;

n distributed grant arbiters, each of which for receiving n bits request signal vector from $n^2$ bits of VOQs state information, generating n bits grant signal vector, transferring each signal to n accept arbiters, generating a backlog indication signal based on a backlog weight and outputting the backlog indication signal to the output arbiter;

n distributed accept arbiters, each of which for receiving the n bits accept signal vector, generating n bits accept signal vector and outputting the n bits of accept signal vector;

a crossbar switch fabric controller for generating $n^2$ bits of crossbar control signal in order to control cross-points of a n×n crossbar switch fabric and n bits of accept signal by analyzing n bits accept signal vectors from each accept arbiters; and an SDB controller for transferring the request signal vector to the output arbiter when the SDB is in non-empty state and analyzing the state of SDBs based on the accept signal vector from the output arbiters and the accept signal from the crossbar switch fabric controller.

5. The apparatus of claim 4, wherein the grant arbiter selects the first request signal among n bits request signal vector in round robin fashion starting from the highest priority request signal, generates a grant signal to an input port when an SDB corresponding to the grant arbiter can accept an additional cell, and the selected input port number +1 (mod n) is stored in a grant arbiter register as a new highest priority only when the grant signal is accepted from the input port.

6. The apparatus of claim 5, wherein each of the grant arbiters prevents that an XSU continuously occupies an output port by limiting the number of cells to be transferred as many as the number of the input ports of the XSU, wherein the number of cell is limited by controlling the size of a backlog weighed measure window to be maximum when the state of an SDB was in empty state in the previous time slot and the state of the SDB is in non-empty state in the current time slot, controlling the size of the backlog weighed measure window to be maximum when the stat of an SDB was in non-empty state in the previous time slot and the cell in the SDB is not transferred to output ports in the current time slot and controlling the size of the backlog weighed measure window to be decreased when the state of an SDB was in non-empty state in the previous time slot and the cell in the SDB is transferred to output ports in the current time slot.

7. The apparatus of claim 4, wherein the backlog weight is used to measure a backlog traffic weight per each output ports of an XSU and is defined as:

$$BW_j = \sum_{i \in W_j} R_{i,j},$$

wherein the $BW_j$ is a backlog weigh measured at an output port j of an XSU, $R_{i,j}$ is a request signal from input port i to output port j, $W_j$ is a set of input ports which are objects of backlog traffic measurement at the output port j.

8. The apparatus of claim 7, wherein an output port of an XSU sends a backlog indication signal defined as:

$$BI_j = \begin{cases} 0 & \text{when } BW_j = 0 \\ 1 & \text{else} \end{cases}.$$

wherein $BI_j$ is a signal generated at the output port j of the XSU and it has a value "0" when $BW_j$ is 0 and otherwise, it has a value "1".

9. The apparatus of claim 4, wherein the accept arbiter selects the first grant signal among n bits grant signal vector from output ports of an XSU in round robin fashion starting from the highest priority grant signal, generates an accept signal to an output port, and the selected output port number +1 (mod n) is stored in a accept arbiter register as a new highest priority.

10. The apparatus of claim 1, wherein the second arbitration function is performed by output arbiters in each output ports, and each of output arbiters selects the first request signal among l bits of request signal from l XSUs in round robin method starting from the highest priority request signal, generates an accept signal to an XSU, and the selected XSU number +1 (mod l) is stored in a output arbiter register as a new highest priority.

11. The apparatus of claim 4, wherein XSU arbiters in $l^2$ XSUs generates a backlog indication signal and a request signal, transfers the backlog indication signal and the request signal to the output arbiters, the output arbiter generates an accept signal as a result of processing and the XSU arbiters increase the scalability by being constructed with n distributed grant arbiters and n distributed accept arbiters.

12. A distributed scheduling method used in a high capacity switching apparatus including a scalable switch structure N input ports, wherein each of the N input ports includes N virtual output queues (VOQ) which are grouped in l virtual output queue groups with n VOQs in each group, wherein the N, l and n is a natural number, N×N switch fabric having $l^2$ crossbar switch units, wherein l VOQ groups are connected to l XSUs; and N output ports connected to l XSUs, the distributed scheduling method comprising the steps of:
  a) at an XSU arbiter of each XSU, scheduling cells of VOQs inputted from the N input ports by using a first arbitration based on a round-robin when N input ports can output maximum l cells; and
  b) at an output port arbiter of each of output ports, selecting and outputting maximum one cell by scheduling cells by using a second arbitration based on a backlog weighed round-robin which is independently operated with the first arbitration, wherein each of the output ports is memory-less type and a cell is selected from scheduling decomposition buffers (SDBs) of the XSUs by the output port arbiter in a time slot, a maximum one cell is selected from l SDBs by the output port arbiter in a time slot and the SDBs that belongs to the $j^{th}$ output port can be expressed as:

$$\sum_{m=0}^{l-1} SDB\left(m, \left\lfloor \frac{j}{n} \right\rfloor, j \bmod n\right).$$

13. The distributed scheduling method of claim 12, the first arbitration includes the steps of:
  a-1) at non-empty VOQs non-empty state, sending a request to every output port arbiter of an XSU in each time slot;
  a-2) at each output port arbiter of an XSU, scanning the buffer state of scheduling decomposition buffers (SDBs), selecting the first request signal starting from the highest priority element in round robin fashion when the SDB can accept a cell, transmitting a grant signal to the selected input port arbiter and updating the highest priority to the selected input port number +1 (mod n) only when the grant signal is accepted by the selected input port; and
  a-3) at each input port arbiter of an XSU, selecting the first grant signal starting from the highest priority element in round robin fashion, transmitting an accept signal to the selected output port arbiter and updating the highest priority to the selected output port number +1 (mod n).

14. The distributed scheduling method of claim 13, wherein the first arbitration further includes the step of:
  a-4) at the XSU, denying the request from the VOQ and maintaining the highest priority when the SDB cannot accept a cell.

15. The distributed scheduling method of claim 12, wherein the second arbitration includes the steps of:
  b-1) at each output ports in an XSU, of which SDB is in non-empty state, transmitting a request signal and backlog indication signal to the output arbiter;
  b-2) at the output arbiter, selecting the first request signal starting from the highest priority element in round robin method;
  b-3) at the output arbiter, monitoring the backlog state of each output ports in an XSU; and
  b-4) updating the highest priority to the selected output port number when there is backlog traffic at the selected output port number, or updating the highest priority to the selected output port number +1 (mod n) when there is no backlog traffic at the selected output port number.

16. The distributed scheduling method of claim 14, wherein the first and the second arbitration are operated independently of each other in order to be suitable for a mess capacity switching system.

* * * * *